June 12, 1951 G. J. GOEPFERT ET AL 2,557,047
COMPOSITE ABRASIVE ARTICLE
Filed May 27, 1947
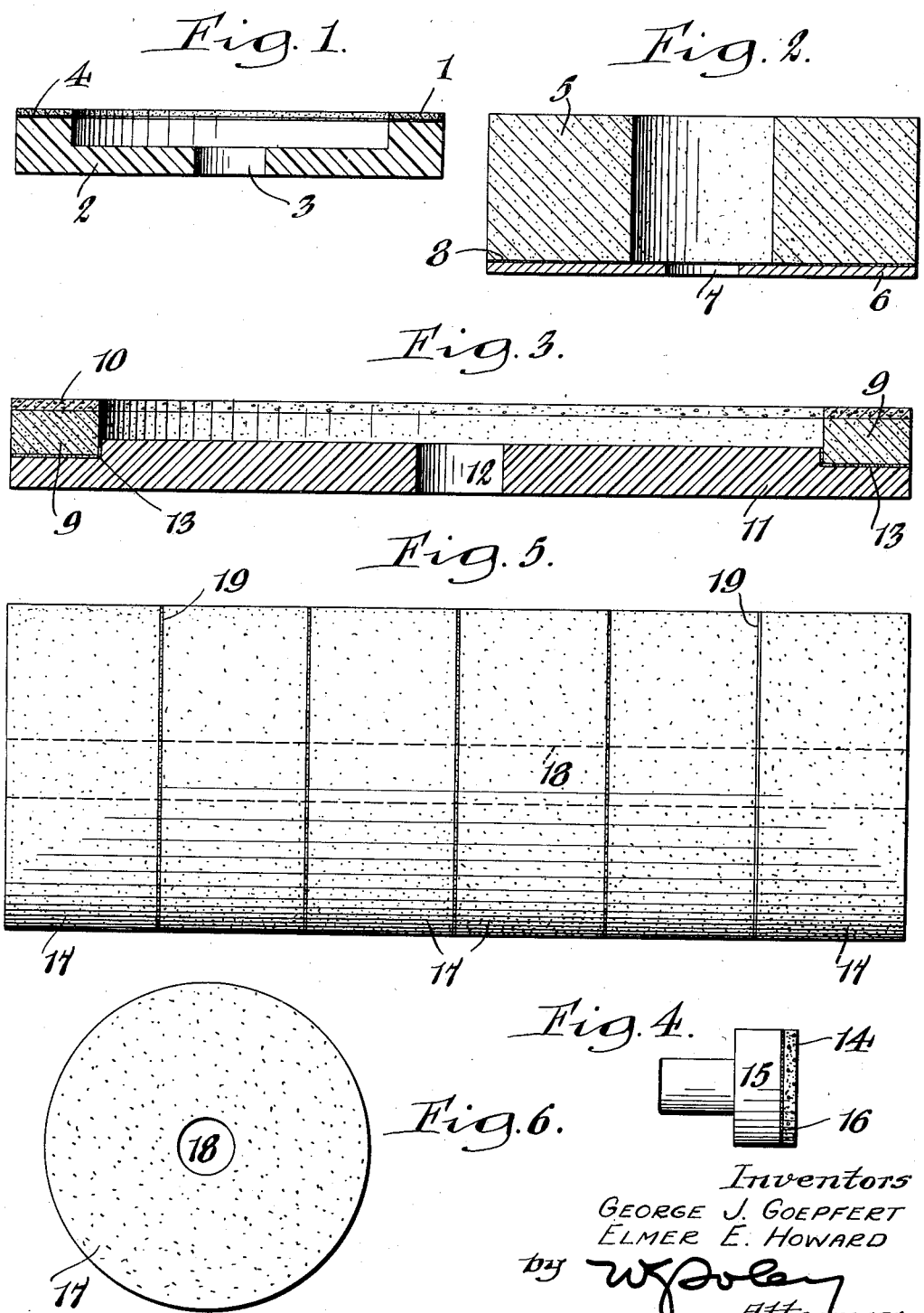
Inventors
GEORGE J. GOEPFERT
ELMER E. HOWARD
by W. Polen
Attorney Patented June 12, 1951

2,557,047

UNITED STATES PATENT OFFICE 2,557,047

COMPOSITE ABRASIVE ARTICLE

George J. Goepfert, Niagara Falls, and Elmer E. Howard, Buffalo, N. Y., assignors to The Carborundum Company, Niagara Falls, N. Y., a corporation of Delaware Application May 27, 1947, Serial No. 750,650

13 Claims. (Cl. 51—298)

This invention relates to composite abrasive articles comprising a rigid bonded abrasive element cemented to a second rigid element by a cement comprising the heat-hardened reaction product of a liquid comprising a diallyl alcohol ester of a polybasic acid.

Composite abrasive articles of the type with which this invention is concerned are made in numerous shapes and sizes. They may be articles in which a rigid bonded abrasive element is cemented to a backing or they may be articles wherein two or more such bonded abrasive elements are cemented together as in the formation of a segmental type abrasive wheel.

In making such articles it is necessary to cement the bonded abrasive element to the backing or to the other element to which it is to be joined. The cements which have heretofore been most commonly used for this purpose are phenol-formaldehyde resins and elastomers including both natural and synthetic rubbers. The phenol-formaldehyde resin cements have been used principally where high heat resistance is required while the more elastic cements have been used where the articles are subjected to shock and particularly to applications where they are used in the presence of a coolant.

Numerous difficulties have been experienced with such cements. The phenol-aldehyde resins require heat treatment at temperatures of 300–350° F. in order to cure them. They rigidify at those elevated temperatures and upon cooling to ordinary temperatures high stresses are set up where the coefficient of expansion of the abrasive element differs materially from that of the backing, as where the abrasive articles are cemented to metallic backings. Because of this fact, losses in the production of such articles are ordinarily quite high with resultant increase in the cost since the cost of the unsalable articles must be absorbed in the price of the articles which are sold. Furthermore, these cements are so inflexible that the articles are easily broken when subjected to shock. They are therefore not suited for use in many abrading operations.

The rubber type cements are capable of absorbing the stresses set up by difference in coefficient of expansion between elements and are also much more shock resistant. However, they are comparatively expensive and articles embodying them are not well adapted for dry grinding where the abrasive elements may reach temperatures as high as 300° F. The rubber base cements lack sufficient tensile strength at such temperatures to safely withstand the stresses imposed upon them when the abrasive articles are used.

When an abrasive article is sold the manufacturer frequently does not know whether the article is to be used wet or dry. On occasion he may expect the article to be used one way and it may, in fact, be used in a different way. For this reason, and further because it would be much more satisfactory from a production standpoint if most articles could be made with the same type of cement, the abrasive industry has long sought a single type of cement for use in making composite articles which would be both satisfactory from a production standpoint and safe in use.

It is accordingly an object of the present invention to provide composite abrasive articles of the type described wherein the elements are cemented together by a cement which is both heat-resistant and resistant to coolants. Another object of the invention is to provide such articles wherein the cement is curable at comparatively low temperatures so that the articles are not highly stressed as a result of the heat treatment used to cure it. Another object of the invention is to provide composite abrasive articles and a method of making such articles which is relatively inexpensive and of such character that the percentage of unacceptable articles is comparatively small. Other objects of the invention will appear from the disclosure hereinafter made.

Understanding of our invention will be facilitated by reference to the accompanying drawings, wherein:

Fig. 1 is a section of an abrasive article made in accordance with one modification of our invention in which a relatively thin abrasive element is cemented to a comparatively large supporting element;

Fig. 2 is a similar section of a second type of abrasive article embodying the invention in which a relatively large bonded abrasive element is cemented to a relatively thin backing;

Fig. 3 is a section of an abrasive article wherein an abrasive ring is cemented to a supporting backing;

Fig. 4 is an elevation of still another form of abrasive article embodying the invention;

Fig. 5 is a side elevation of a sectional abrasive article embodying our invention; and Fig. 6 is an end elevation of the article of Fig. 5.

Referring to the drawings, the composite abrasive article of Fig. 1 comprises a bonded abrasive ring 1 cemented to a backing 2 provided with an arbor hole 3 by a cement 4. The abrasive element 1 comprises a thin ring of resin bonded diamonds. The backing element 2 may be either a molded phenol resin-filler composition or it may be metallic aluminum. The composition of the cement will be provided hereinafter under the examples.

In Fig. 2 the composite article comprises a ceramic bonded abrasive element 5 cemented to a steel backing 6 provided with an arbor hole 7 by a cement 8.

Fig. 3 shows a composite article wherein a layer 9 of vitrified bonded silicon carbide which has been molded prior to the vitrification to a thin layer 10 of vitrified bonded diamonds is cemented to a molded phenol resin bonded backing 11 having an arbor hole 12 by a cement 13.

The article of Fig. 4 consists of a metal bonded diamond abrading element 14 cemented to a steel nub 15 by a layer of cement 16.

The sectional article shown in Figs. 5 and 6 comprises six rings of resin bonded silicon carbide 17 provided with arbor holes 18 and cemented together by cement layers 19.

For most purposes we prefer to use cements prepared by admixing an inert inorganic filler with a liquid component comprising both a diallyl ester of a polybasic acid and an unsaturated acid ester of a glycol such as the diethylene glycol ester of maleic or fumaric acid or a mixture of acids such as a mixture of maleic acid with adipic or sebacic acid. We have also successfully used the diallyl alcohol esters alone such as diallyl phthalate, diallyl fumarate and diallyl succinate as well as mixtures of two or more diallyl esters, but we have usually found it preferable to admix one or more of such esters with the glycol esters of unsaturated polycarboxylic acids or the glycol esters of a mixture of acids. Where the diallyl alcohol esters are used alone it is desirable to partially polymerize them in order to develop sufficient viscosity.

As is evidenced by the brief reference made to the drawings, our invention has been successfully employed in cementing together numerous systems. However, we have found it desirable to modify the characteristics of the cement for different systems, depending upon the relative coefficient of expansion of the abrasive element and the backing and to some extent upon the size and shape of the article and the manner in which it is to be used. We have found that cements in which the resin component consists solely of the diallyl alcohol esters and cements wherein the liquid consists of a mixture of such esters with glycol esters of unsaturated dicarboxylic acid such as fumaric and maleic acids are relatively rigid and inflexible but very highly heat resistant. Diallyl phthalate has been found to be particularly satisfactory for use in making these more rigid cements.

By modifying the glycol ester, as by making an ester of mixed acids including saturated as well as unsaturated acids or by employing small quantities of a suitable drying oil such as tung oil or Chinawood oil or the fatty acids thereof, we have been able to impart some flexibility to the resin constituent at the sacrifice of some heat resistance. Such cements and particularly those wherein the allyl ester is diallyl phthalate are more satisfactory for some purposes than extremely rigid cements, especially where the composite abrasive articles are subjected to high stresses in use or where the relative coefficient of expansion of the abrasive element and the backing is comparatively high.

The following examples are illustrative but not limitative of liquid constituents which we employ in the cements used in making our composite abrasive articles.

Example I 106 parts diethylene glycol and 86 parts maleic anhydride were put into a three-necked glass flask fitted with a thermometer, a stirrer, and a gas bubbling tube, all of which extended nearly to the bottom of the flask. Deoxygenated nitrogen was bubbled into the flask to replace all air present and the flask was then heated to 210–220° C. Nitrogen was passed continuously through the liquid mass, which was continually stirred. The reaction mixture was kept at the indicated temperature for 3 to 4 hours and was then cooled in the nitrogen atmosphere. The diethylene glycol maleate thus prepared was a very viscous water-white liquid.

Example II

The mixed diethylene glycol ester of maleic and adipic acids was prepared according to the method of Example I from a mixture consisting of 106 parts diethylene glycol, 44 parts maleic anhydride and 65.6 parts of adipic acid.

Example III

Following the procedure of Example I and employing the apparatus there described, a mixed maleic and sebacic acid ester of triethylene glycol was prepared. The reactants consisted of 150 parts of triethylene glycol, 44 parts maleic anhydride and 101 parts sebacic acid.

In view of the fact that the abrasive component of abrasive articles sometimes reaches temperatures as high as 300° F. and upward under certain conditions of use it is necessary that cements used in such articles have sufficient strength at these elevated temperatures to resist the stresses imposed upon them. We have therefore found it desirable to determine the tensile strength of systems which include these cements both at room temperature and at 300° F. In making the tensile tests two steel discs provided with spindles for grasping in the jaws of a tensile testing machine are cemented to the flat surfaces of ceramic bonded silicon carbide abrasive discs. The test piece thus made is heated to cure the cement and is then pulled in a tensile testing machine. The following table shows the tensile strength at room temperature and at 300° F. of such systems in which the esters of the three assemblages were employed in admixture with diallyl phthalate. The table shows the kinds and proportions of the liquid constituents and a statement of the flexibility characteristic of castings made from the mixtures. The specific compositions of the cements employed will be given hereinafter.

| Liquid Components | Relative Flexibility | Room Temperature | 300° F. |
|---|---|---|---|
| 50 parts ester of Example I<br>50 parts diallyl phthalate | Rigid | 1,345 | 815 |
| 50 parts ester of Example II<br>50 parts diallyl phthalate | Somewhat flexible | 1,370 | 400 |
| 50 parts ester of Example III<br>50 parts diallyl phthalate | Flexible | 1,325 | 300 |

In making cements for use in our invention we have found it essential to control the plasticity or flow of the cement and we have found that this property is a function of the viscosity of the liquid constituent and of the kind and amount of filler used.

While fillers are not absolutely essential for some purposes, we have found them to be highly desirable for most purposes and one of the features of our invention is the employment in a cement of a filler comprising a substantial proportion of inorganic fibrous material such as asbestos. We discovered that such material has the unique property of preventing the liquid constituent of the cement from flowing when the assembled article is heated to harden the liquid constituent. The asbestos apparently has an adsorptive effect on the liquid constituent and holds it within the body of the cement, preventing seepage of the liquid outside the joint with consequent disfigurement of the abrasive article and weakening of the cement. Where composite articles such as those illustrated in the drawings are made with conventional fillers there is a tendency for the liquid constituent of cements to flow out from the joint and become attached to the peripheral surface. Such flow not only detracts from the appearance of the article but weakens the joint because the liquid constituent is needed in the body of the cement in order to develop the ultimate in strength. In addition to such seepage outside the joint, where conventional fillers are used with somewhat porous abrasive elements there is a tendency for the liquid constituent of the cements to penetrate too deeply into the abrasive element, thus further starving the cement of the resinous constituent and weakening the ultimate article.

The addition of a filler to the resins which we use in making the cements of our invention is particularly important because the viscosity of the resin-forming liquids decreases very rapidly with increase of temperature. It is desirable that a cement be of such character that it can be made to have a spreadable consistency, generally about the same as that of a mortar such as is used for laying bricks, at ordinary temperatures. When such cement is heated to resinify the liquid the liquid component of our cements thins out very rapidly with resultant tendency for it to flow.

Asbestos is obtainable in various grades, depending upon the extent to which the crude asbestos has been refined. The long fibers obtainable by a refining operation are relatively expensive whereas the shorter fibers and particularly the relatively crude material which is left after the long fibers have been removed and which contains comparatively short fibers and substantial amounts of granular impurities are relatively cheap. Such material is known as "shorts."

We have found that these so-called "asbestos shorts" are particularly well suited for making the cements of our invention. We have also found that it is possible to use granular fillers along with the shorts provided that a substantial amount of the shorts are included or even to use the material from asbestos shorts which passes through a No. 14 screen. The latter material contains relatively few fibers substantially none of which are more than 200 microns long whereas the shorts contain some fibers as much as 500 microns long. In addition to the fibrous material, these shorts contain granular impurities which range in size from about 1 micron to 200 microns in average diameter.

While the consistency of the cement obtained from any particular resin-forming liquid varies with the kind and amount of filler used we have found that the proportion of filler is not particularly critical from the standpoint of spreadability. For example, using a resin-forming liquid which had a viscosity of 19,000 centipoises we have been able to make cements which are satisfactorily spreadable with as much as 37½% and as little as 16½% by weight of asbestos shorts filler, based on the resin weight.

In order to evaluate the cements and quantitatively determine the effect of the filler on preventing flow we devised a test method the details of which are as follows:

A glass vial having a body portion approximately 20 millimeters in diameter and 60 millimeters long and a mouth portion approximately 12 millimeters in diameter and 10 millimeters long, and having a capacity of 2.5 cubic centimeters is filled with the cement and struck off flush with the mouth to provide a plane surface at the mouth of the vial. The vial containing the cement is mounted on a flat plate with its longitudinal axis parallel to the plane of the plate. The plate with the vial mounted on it is placed in a heated oven in such a way that the plane surface of the plate and the longitudinal axis of the vial form an angle of 15° with the horizontal with the open mouth of the vial at the lower end.

Where a non-absorptive filler is used or where an insufficient amount of an asbestos filler is used the cement flows from the vial and forms a strip on the plate. The material at first flows from the vial as a result of the thinning of the liquid constituent brought about by the heat. However, the heat also induces reaction in the liquid component and causes it to gel and then resinify and of course the flow from the vial stops when the gelation takes place. The length of the strip formed on the plate after heating for 25 minutes at 175° F. is measured and we call that length in inches the "flowability factor."

In studying the use of fillers we proceeded on the basis of using a volume relationship between the filler and the liquid rather than on a weight basis because of the difference in apparent density of the different kinds of fillers. This relationship was obtained by determining the "bump density" of the different fillers and converting to a volume basis equivalent to that of the asbestos shorts. The bump density is obtained by placing a weighted amount of the filling material in a cylindrical container, jarring it in a machine to cause it to settle, and measuring the volume occupied by the filler at the end of a predetermined number of bumps.

In making our study of the flow of the cements made with different fillers we used a standard formula for the liquid components which consisted of:

| | Grams |
|---|---|
| Diethylene glycol maleate of Example I | 15 |
| Diallyl phthalate | 15 |
| Benzoyl peroxide | 1.5 |
| Triphenyl phosphate | 1.5 |
| Cobalt linoleate | .44 |

The following table shows the volume relationship obtained by bump density, the grams of filler added to the liquid component described above, and the flowability factor (flow in inches obtained by the method previously described).

| Filler | Volume Relation | Grams Filler Used | Flowability Factor (Inches) |
|---|---|---|---|
| Asbestos shorts #1 | 95.7 / 95.7 | 9.0 / 6.0 | 0 / ⅛ |
| Asbestos shorts #2 | 117 / 117 | 11.0 / 7.3 | 0 / 1 |
| #14 Screenings of Asbestos shorts #1 | 135 / 135 | 12.9 / 8.6 | 0 / ⅝ |
| Pulverized flint | 215 | 40.4 | 11¾ |
| Pulverized flint and Asbestos shorts #1 | | ¹ 20.2 / ² 9.0 | 0 |
| Tennessee ball clay | 149 | 28.1 | 10¾ |
| Diatomaceous earth | 41.5 | 7.8 | 3 |
| Pulverized fused quartz | 63 | 34.5 | 2 |
| 220 Mesh silicon carbide | 235 | 44.3 | 9¼ |

¹ Flint.
² Asbestos.

The following examples illustrate specific cement compositions which we have successfully employed in carrying out our invention.

*Example IV*

| Components: | Parts by weight |
|---|---|
| Ester of Example I | 50 |
| Diallyl phthalate monomer | 50 |
| Asbestos shorts #1 | 60 |
| Catalyst | 10 |

The catalyst consisted of equal parts of benzoyl peroxide and triphenyl phosphate. The viscosity of the liquid constituents was 610 cp. at 25° C. The flowability factor of the cement was 0.

*Example V*

| Components: | Parts by weight |
|---|---|
| Ester of Example II | 50 |
| Diallyl phthalate monomer | 50 |
| Asbestos flock | 60 |
| Catalyst of Example IV | 10 |

The viscosity of the liquid constituents was 548 cp. at 25° C. The flowability factor of the cement was 0.

*Example VI*

| Components: | Parts by weight |
|---|---|
| Ester of Example I | 50 |
| Diallyl phthalate prepolymer | 50 |
| Pulverized fused quartz | 170 |
| Catalyst of Example IV | 10 |
| Cobalt linoleate | 1.6 |

The diallyl phthalate prepolymer is a viscous liquid having a viscosity of 250 cp. obtained by partially polymerizing monomeric diallyl phthalate and stopping the polymerization before the material solidifies. The pulverized fused quartz was ground to a fineness of 200 mesh and finer. The liquid constituents had a viscosity at 25° C. of 19,000 cp. The flowability factor of the cement was 2.

*Example VII*

| Components: | Parts by weight |
|---|---|
| Ester of Example I | 25 |
| Diallyl phthalate prepolymer | 25 |
| Prepolymer A | 50 |
| Catalyst of Example IV | 10 |
| Diatomaceous earth | 200 |

Prepolymer A is a prepolymerized diethylene glycol bis (allyl carbonate) of the type described and claimed in U. S. Patent No. 2,384,115. It is a solid at ordinary temperatures. The diatomaceous earth is an acicular and elongated shaped silica of 200 mesh and finer particle size. The flowability factor of the cement was 2½.

The following examples describe the compositions and methods employed in making the abrasive articles of our invention which have been illustrated in the drawings:

*Example VIII*

The backing 2 for a cup wheel of the shape illustrated in Fig. 1 and having a diameter of 6 inches, a thickness at the periphery of ¾ inch and at the bottom of the cup of ⅜ inch and a rim width of ¾ inch was molded from a phenol resin-asbestos filler composition which is a molding compound designed to have high heat resistance and impact strength, and was heated to cure the resin.

A resin bonded diamond abrasive element 1 of corresponding diameter and rim width and 1/16 inch thick was prepared from a mixture of the following composition:

| Components: | Parts by weight |
|---|---|
| 100 mesh diamond bort | 50 |
| Liquid phenol-formaldehyde resin | 3 |
| Powdered phenol-formaldehyde resin | 22 |
| Powdered cryolite | 25 |

The liquid phenol-formaldehyde resin had a viscosity of about 400 cp. at 25° C. and the powdered heat-hardenable phenol-formaldehyde resin was a resin of the two-step type which was convertible on heating to an infusible insoluble condition. The abrasive element was first molded from this mixture and then heated to cure the resin bond according to conventional practice. Thereafter the ring was disked on each side to provide plane parallel surfaces.

The mold surface of one side of the diamond abrasive element and the upper surface of the backing element 2 were suitably cleaned and each coated with the cement of Example VI. The abrasive element was then placed on the backing element with the two cement coated surfaces together and was pressed lightly to cause the two surfaces to adhere. The assembled article was then put into an oven in which the temperature was 225° F. and heated at that temperature for 3 hours. At the end of that time the cement had set up to a strong rigid condition and the liquid components had been reacted to the point where they were highly resistant to heat and to coolants of the type employed in wet grinding.

*Example IX*

One of the flat surfaces of a conventional vitrified bonded abrasive made and sold under the grading "GC80-I8-VW" and consisting of a ring 6 inches in diameter and 2 inches thick and having an arbor hole 1 inch in diameter was suitably cleaned and coated with a layer of the cement of Example V. A steel disc ⅛ inch thick and 6 inches in diameter was sandblasted to clean and roughen the surface and a layer of the same cement was spread over a band 2½ inches wide extending inward from the periphery. The abrasive ring was then placed on the steel backing with the cement coated surfaces in contact, was lightly pressed to assure contact over all the cemented surfaces, and the assembled article was then put into an oven in which the temperature was 175° F. and heated at that temperature for 6 hours. At the end of that time the article was removed from the oven and it was found that the cement had hardened to a strong infusible insoluble condition.

*Example X*

A molded phenolic resin backing 10 inches in diameter and ½ inch thick at the center and provided with a recess ⅛ inch deep and 1 inch wide around the periphery was molded and heat-hardened as described in Example VIII.

A bond mix for a vitrified bond was prepared by ball milling together:

| | Parts by weight |
|---|---|
| Blended spar | 5.7 |
| Tennessee ball clay | 11.4 |
| California talc | 77.9 |
| 320 grit silicon carbide | 5.0 |

71 parts by weight of that mix were then mixed with 29 parts by weight of 220 grit diamond bort and 5 parts of water to make a moldable mix. A mold 10 inches in diameter was provided with an arbor pin 8 inches in diameter to leave a peripheral space 1 inch wide and a sufficient quantity of the mix to compress to a thickness of ⅛ inch was put into this mold space. An additional quantity of the dry mix without the diamond bort was moistened to make it moldable and enough of this mix was then placed on top of the leveled diamond-containing mass to compress to a thickness of approximately ½ inch. The mixture was compressed and the molded ring was removed from the mold and fired in a kiln to vitrify the bond. Upon removal from the kiln the two plane surfaces were disked to make them flat and parallel and the plane face of the ring containing the silicon carbide but not the diamonds was coated with the cement of Example VII. The suitably cleaned roughened surface of the recessed portion of the backing was similarly coated with the same cement and the two cemented surfaces were put together and pressed to assure firm contact over all the cemented surfaces. The article was then heat treated for 6 hours at 175° F. whereupon the cement was hardened and made highly heat-resistant and insoluble.

Example XI

A metal bonded diamond nub as illustrated in Fig. 4 having a metal bonded diamond abrading element 14 which was 1 inch in diameter and ⅛ inch thick was made by putting into a suitable mold a mixture of the following composition:

| | Parts by weight |
|---|---|
| 240 grit diamond bort | 5.8 |
| Zinc | 15 |
| Copper powder | 25 |
| Silver powder | 60 |

The metal powders were finer than 200 mesh. The mix was leveled off and pressed at a pressure of 60,000 p. s. i. The pressed disc was then removed from the mold, placed between two ceramic bats and sintered under a slight pressure to prevent warping in a non-oxidizing atmosphere at a temperature of 650° C.

The plane surfaces of the disc were cleaned and one of them was coated with a thin layer of liquid phenol-formaldehyde resin. The coated disc was then heated to cure the resin. The resinous surface was roughened and then coated with the cement of Example VII. This coating of phenolic resin is used because the copper in the metal alloy inhibits the curing of the liquid constituents of the cement. Where metal bonds which do not contain any copper or other inhibiting metal are employed the step of preliminarily coating with the phenolic resin is unnecessary.

The appropriate surface of the backing element 15 was cleaned and roughened and similarly coated with the cement of Example VII. The two cemented surfaces were then pressed together under sufficient pressure to insure intimate contact and the assembled article was heated for 3 hours at 225° F. to harden the cement to the infusible insoluble condition.

Example XII

A sectional wheel as illustrated in Figs. 5 and 6 was built up from six sections 22 inches in diameter and 9 inches thick and provided with arbor holes 4 inches in diameter. The elements were resin bonded silicon carbide of a conventional type designated by the grading "C30–N–B." The wheel was made by placing on a vertical spindle 4 inches in diameter one of the sections, cleaning and roughening the upper plane surface of the section and coating with the cement of Example IV and assembling on that block the other sections with their plane surfaces suitably cleaned and coated with the same cement. The assembled wheel was brought up to 225° F. at the rate of 25° F. per hour and was held for 4 hours at 225° F. This heat treatment cured the liquid constituent of the cement to a strong heat-resistant condition and the assembled wheel was found to be wholly satisfactory, the sections being strongly cemented together.

In addition to the specific unsaturated esters which we have described in the examples, we may prepare esters from ethylene, diethylene or triethylene glycol or mixtures thereof. We may also blend with those glycols small amounts of other polyhydric alcohols such as glycerine and sorbitol.

Similarly, we may employ other polybasic acids than those described in the examples. Among the acids which we may use in making our esters are maleic, fumaric, itaconic, mesaconic and citraconic. As has previously been stated, the esters may be modified by employing mixtures of acids such as one or more of those which are enumerated along with saturated polycarboxylic acids such as adipic, sebacic and phthalic acid or with unsaturated monocarboxylic acids such as acrylic, methacrylic, cinnamic and crotonic acids. Inclusion of saturated acids promotes flexibility which may also be imparted by employing the fatty acids of drying oils or even small quantities of the oils themselves.

It is essential that the esters which we admix with our diallyl esters contain some unsaturation. This is preferably obtained by using a glycol with a preponderance of the acid of the ester being an unsaturated polycarboxylic acid. However, part of the glycol may be replaced by an unsaturated alcohol such as allyl or methallyl alcohol.

The diallyl esters may be formed from allyl alcohol and either a saturated or an unsaturated acid. Among the acids are phthalic, maleic, fumaric, succinic, adipic, sebacic, and carbonic, particularly the mixed carbonic acid ester of allyl alcohol with a glycol such as ethylene or diethylene glycol. Where the allyl esters are made from unsaturated acids and where the glycol esters are formed only from unsaturated dicarboxylic acids the resins of the cements are very fast curing and relatively inflexible. The inclusion of saturated groups in either the diallyl or the glycol esters as by using a mixed glycol ester of both an unsaturated and a saturated alcohol or an allyl alcohol ester of a saturated acid reduces the rigidity and imparts more or less flexibility to the cements. Such increase in flexibility is obtained at the expense of high heat resistance but is desirable for some purposes, as for example, applications where the previous practice has been to use the rubber base cements.

We have described various modifications and embodiments of our invention and have illustrated it by reference to specific examples. It is to be understood, however, that the invention is not limited to the specific materials and embodiments described herein but, rather, is to be considered to have the scope of the following claims.

We claim:

1. A composite abrasive article comprising a rigid bonded abrasive element cemented to a second rigid element by a cement consisting essentially of a silicic filler selected from the group consisting of asbestos shorts, diatomaceous earth and fused quartz and a resinous component, said resinous component consisting essentially of the solids obtained by heat-hardening a liquid consisting essentially of about 50% to 100% of a diallyl ester of a dibasic acid and from 0 to about 50% of a glycol ester of an unsaturated dibasic acid, said liquid having a viscosity in the range of 250-20,000 centipoises at 25° C. and said cement in the unhardened condition having a flowability factor in the range of 0-3 inches and in the hardened condition having a tensile strength at 300° F. of at least 200 pounds per square inch.

2. An article as claimed in claim 1 wherein the allyl ester is diallyl phthalate and the glycol ester is diethylene glycol maleate.

3. An article as claimed in claim 1 wherein the allyl ester is diallyl phthalate and the glycol ester is a diethylene glycol mixed ester of maleic and adipic acids.

4. An article as claimed in claim 1 wherein the allyl ester is diallyl phthalate and the glycol ester is triethylene glycol mixed ester of maleic and sebacic acids.

5. An article as claimed in claim 1 wherein the filler is asbestos shorts.

6. An article as claimed in claim 5 wherein the filler is present within the range of about 20-40 parts of filler to 100 parts resin by weight.

7. An article as claimed in claim 1 wherein the filler is asbestos shorts, the allyl ester is diallyl phthalate and the glycol ester is diethylene glycol maleate.

8. An article as claimed in claim 1 wherein the filler is pulverized fused quartz.

9. An article as claimed in claim 1 wherein the filler is diatomaceous earth.

10. An article as claimed in claim 1 wherein the allyl ester is a partially polymerized diallyl phthalate.

11. An article as claimed in claim 10 wherein the glycol ester is diethylene glycol maleate.

12. An article as claimed in claim 11 wherein the filler is asbestos shorts and the filler is present within the range of about 20-40 parts of the asbestos shorts to 100 parts resin by weight.

13. An article as claimed in claim 1 wherein the resinous component consists essentially of polymerized diallyl phthalate, the filler is asbestos shorts, and the filler is present within the range of about 20-40 parts of the asbestos shorts to 100 parts resin by weight.

GEORGE J. GOEPFERT.
ELMER E. HOWARD.

REFERENCES CITED

The following references are of record in the file of this patent:

UNITED STATES PATENTS

| Number | Name | Date |
|---|---|---|
| 2,460,181 | Marshall | Jan. 25, 1949 |
| 2,414,474 | March | Jan. 21, 1947 |
| 2,409,633 | Kripa | Oct. 22, 1946 |
| 2,407,479 | D'Alelio | Sept. 10, 1946 |
| 2,404,192 | Ries et al. | July 16, 1946 |
| 2,398,890 | Howard | Apr. 23, 1946 |
| 2,394,478 | Prentice | Feb. 5, 1946 |
| 2,342,313 | Van Nimwegen | Feb. 22, 1944 |
| 1,989,243 | Nash et al. | Jan. 29, 1935 |
| 1,832,515 | Webster | Nov. 17, 1931 |